(12) United States Patent
Faust et al.

(10) Patent No.: US 10,311,658 B2
(45) Date of Patent: Jun. 4, 2019

(54) UNEXPECTED IMPULSE CHANGE COLLISION DETECTOR

(71) Applicant: Waymo LLC, Mountain View, CA (US)

(72) Inventors: Aleksandra Faust, Palo Alto, CA (US); Nathaniel Fairfield, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 85 days.

(21) Appl. No.: 15/288,463

(22) Filed: Oct. 7, 2016

(65) Prior Publication Data

US 2018/0102001 A1    Apr. 12, 2018

(51) Int. Cl.
| | |
|---|---|
| G07C 5/08 | (2006.01) |
| G05D 1/00 | (2006.01) |
| G06N 7/00 | (2006.01) |
| B60K 28/14 | (2006.01) |
| B60R 21/0132 | (2006.01) |
| B60W 30/08 | (2012.01) |
| B60R 21/01 | (2006.01) |

(52) U.S. Cl.
CPC ............ *G07C 5/0816* (2013.01); *B60K 28/14* (2013.01); *B60R 21/0132* (2013.01); *G05D 1/0088* (2013.01); *G06N 7/005* (2013.01); *B60R 2021/01252* (2013.01); *B60W 2030/082* (2013.01); *B60W 2520/105* (2013.01); *B60W 2550/10* (2013.01); *B60W 2550/402* (2013.01); *B60Y 2302/05* (2013.01)

(58) Field of Classification Search
CPC ..... G07C 5/0816; G06N 7/005; G05D 1/0088
See application file for complete search history.

(56) References Cited

U.S. PATENT DOCUMENTS

| 6,243,633 | B1 | 6/2001 | Kanameda et al. |
|---|---|---|---|
| 7,140,637 | B2 | 11/2006 | Roelleke et al. |
| 8,930,060 | B1 | 1/2015 | Lu et al. |
| 9,043,077 | B2 | 5/2015 | Doerr et al. |

(Continued)

FOREIGN PATENT DOCUMENTS

DE    102014106692 A1    12/2014

OTHER PUBLICATIONS

International Search Report and Written Opinion for International Application No. PCT/US2017/055568 dated Jan. 9, 2018. 15 pages.

*Primary Examiner* — Michael D Lang
(74) *Attorney, Agent, or Firm* — Botos Churchill IP Law

(57) ABSTRACT

Aspects of the disclosure relate to detecting vehicle collisions. In one example, one or more computing devices may receive acceleration data of a vehicle and the expected acceleration data of the vehicle over a period of time. The one or more computing devices may determine a change in the vehicle's acceleration over the period of time, where the change in the vehicle's acceleration over the period of time is the difference between the expected acceleration data and the acceleration data. The one or more computing devices may detect an occurrence when the change in the vehicle's acceleration is greater than a threshold value and assign the occurrence into a collision category. Based on the assigned collision category, the one or more computing devices may perform a responsive action.

10 Claims, 8 Drawing Sheets

(56) References Cited

U.S. PATENT DOCUMENTS

| | | |
|---|---|---|
| 2004/0102882 A1 | 5/2004 | Sala et al. |
| 2005/0010340 A1 | 1/2005 | Peravali et al. |
| 2013/0261869 A1 | 10/2013 | Brenneis et al. |
| 2015/0058045 A1 | 2/2015 | Santora |
| 2015/0365810 A1 | 12/2015 | Yamaguchi et al. |
| 2016/0052473 A1 | 2/2016 | Debenham et al. |
| 2017/0053461 A1* | 2/2017 | Pal .......................... G07C 5/02 |

* cited by examiner

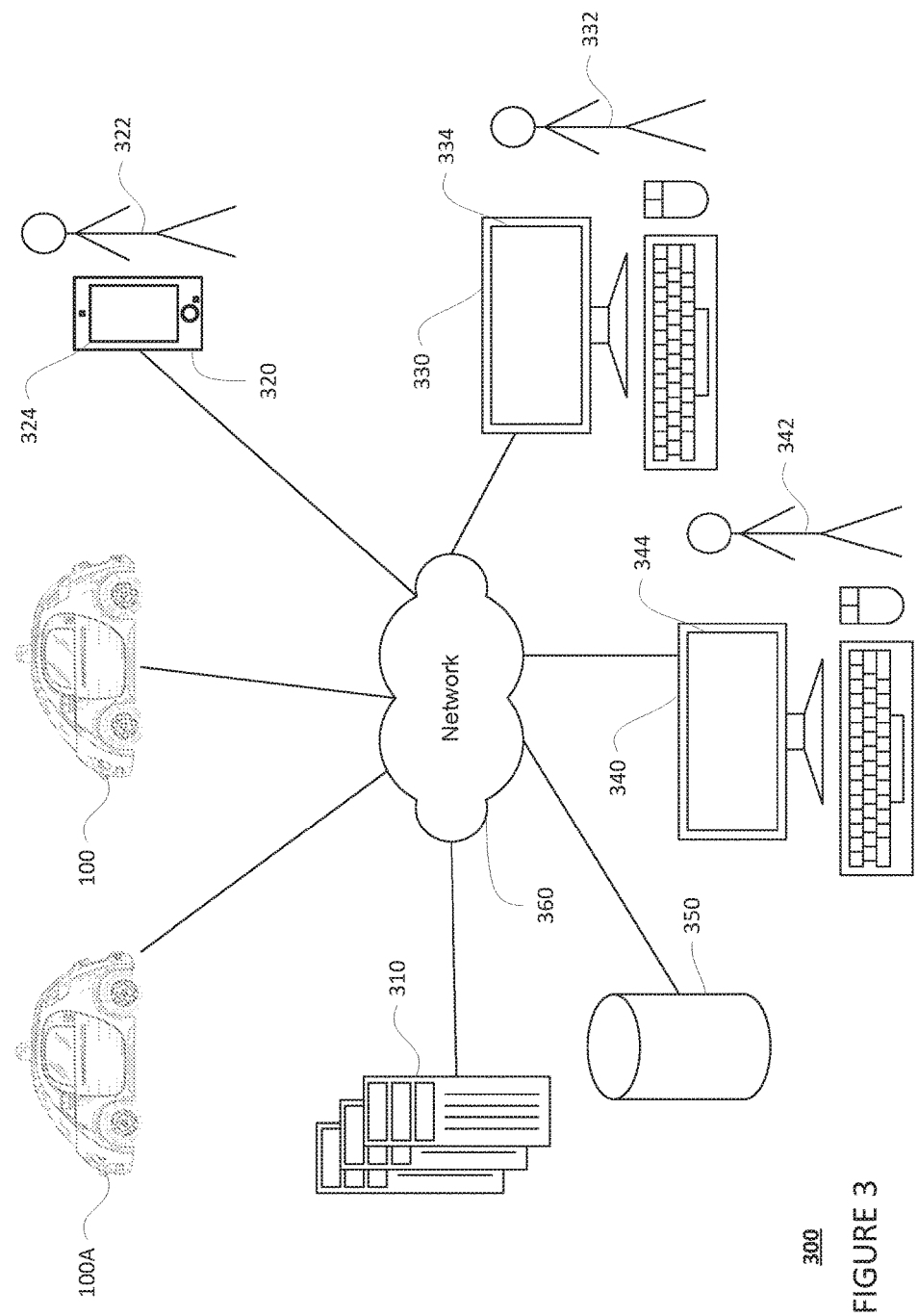

UNEXPECTED IMPULSE CHANGE COLLISION DETECTOR

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict what an object is likely to do for some brief period into the future which can be used to control the vehicle in order to avoid these objects, or minimize damage in the case of an unavoidable collision. Thus, detection, identification, and prediction are critical functions for the safe operation of autonomous vehicle.

BRIEF SUMMARY

Embodiments within the disclosure relate generally to a method for detecting vehicle collisions including receiving, by one or more computing devices, acceleration data of a vehicle over a period of time and receiving, by the one or more computing devices, expected acceleration data of the vehicle over the period of time. The one or more computing devices may determine a change in the vehicle's acceleration over the period of time, where the change in the vehicle's acceleration over the period of time is the difference between the expected acceleration data and the acceleration data. The one or more computing devices may detect an occurrence when the change in the vehicle's acceleration is greater than a threshold value and assign the occurrence into a collision category. Based on the assigned collision category, the one or more computing devices may perform a responsive action.

In some embodiments, the expected acceleration data is received from an acceleration and deceleration system and the acceleration data is received from a positioning system.

In some embodiments, the collision categories include at least high energy collision category and a low energy collision category.

In some embodiments, the occurrence is categorized as a high energy collision, and the responsive action performed by the one or more computing devices includes one or more of shutting down an engine, alerting occupants of the vehicle, alerting an emergency response team, alerting a remote assistant operator, unlocking and/or opening doors of the vehicle, and/or causing the vehicle to pull over and stop.

In some embodiments, the occurrence is categorized as a low energy collision, and the responsive action performed by the one or more computing devices includes automatically alerting a remote assistant operator and receiving a communication from the remote assistant operator, where the communication causes the vehicle to automatically pull over and shut down or continue driving.

In some embodiments, additional data of a the vehicle's surroundings captured by a sensor during the period of time and the one or more computing devices may determine, based on the additional data an object in the vehicle's vicinity and capable of contacting the vehicle during the period of time and based on the determining of the object, re-categorize the occurrence into the high-fidelity low energy collision category.

In some embodiments, when the occurrence is categorized as a high-fidelity low energy collision, the responsive action performed by the one or more computing devices includes automatically shutting down unnecessary vehicle systems, alerting an emergency response team, alerting a remote assistant operator, unlock and/or opening the vehicle's doors.

Another aspect includes a system for or detecting vehicle collisions, the system comprising one or more processors. The one or more processors may be configured to receive acceleration data of a vehicle over a period of time, receive expected acceleration data of the vehicle over the period of time, determine a change in the vehicle's acceleration over the period of time, where the change in the vehicle's acceleration over the period of time is the difference between the expected acceleration data and the acceleration data, detect an occurrence when the change in the vehicle's acceleration is greater than a threshold value, assign the occurrence into a collision category, and perform a responsive action based on the assigned collision category.

In some embodiments the system further comprises the vehicle.

Another aspect includes a non-transitory computer readable medium on which instructions are stored, the instructions when executed by one or more processors, cause the one or more processors to perform a method of detecting vehicle collisions. The method may include receiving, by one or more computing devices, acceleration data of a vehicle over a period of time and receiving, by the one or more computing devices, expected acceleration data of the vehicle over the period of time. The one or more computing devices may determine a change in the vehicle's acceleration over the period of time, where the change in the vehicle's acceleration over the period of time is the difference between the expected acceleration data and the acceleration data. The one or more computing devices may detect an occurrence when the change in the vehicle's acceleration is greater than a threshold value and assign the occurrence into a collision category.

BRIEF DESCRIPTION OF THE DRAWINGS

FIG. 3 is a pictorial diagram of a system in accordance with aspects of the disclosure.

DETAILED DESCRIPTION

Overview

Figure 1:
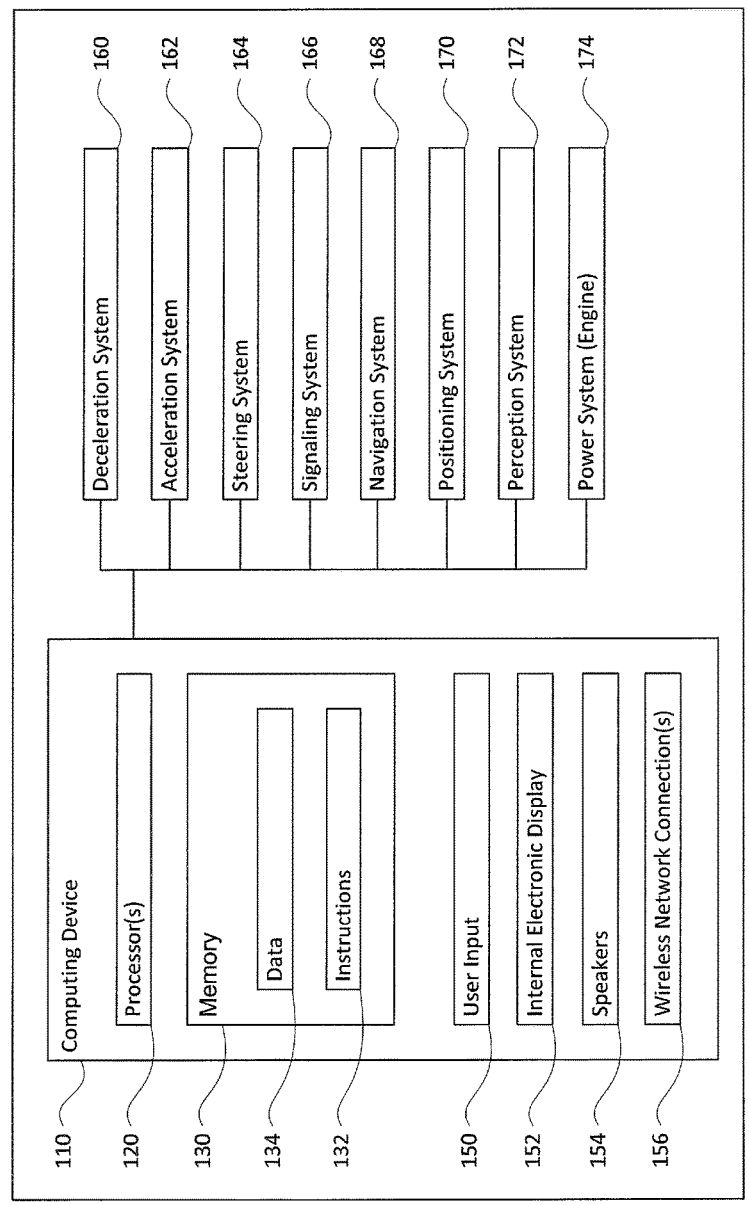
FIG. 1 is a functional diagram of an example vehicle in accordance with an exemplary embodiment.
Figure 2A:
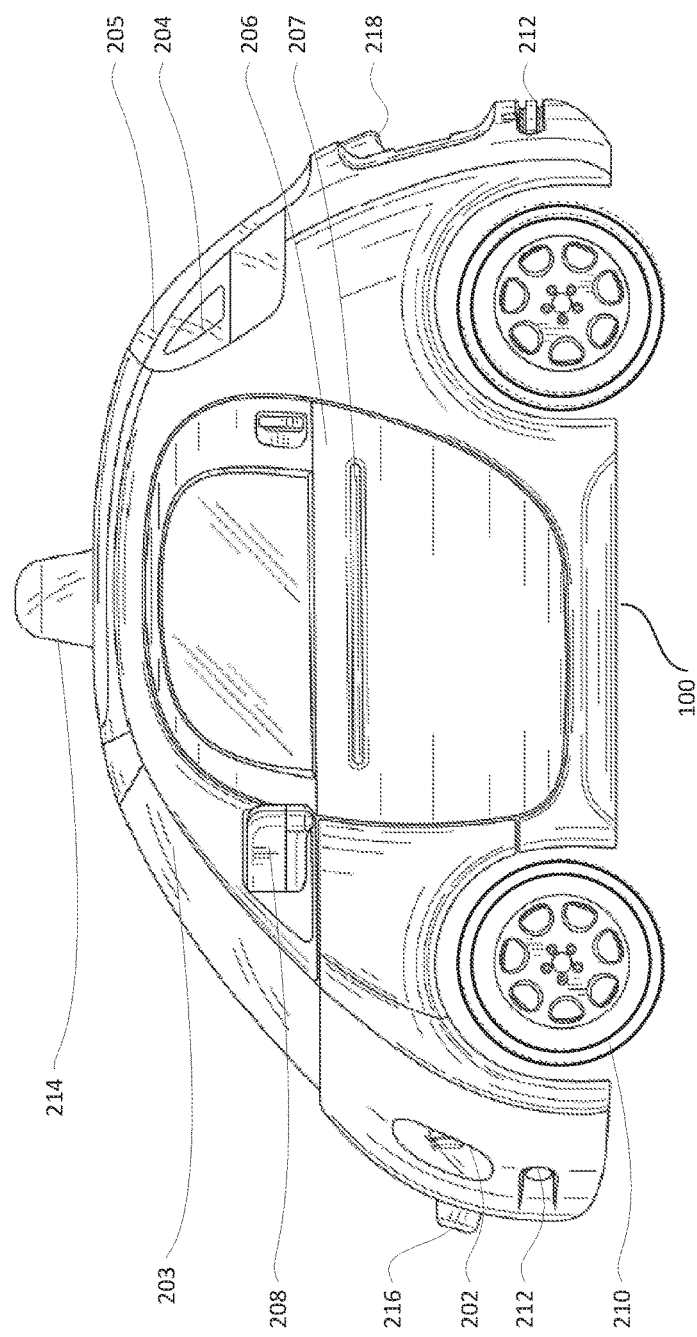
FIGS. 2A-2D are example external views of a vehicle in accordance with aspects of the disclosure.
Figure 2C:
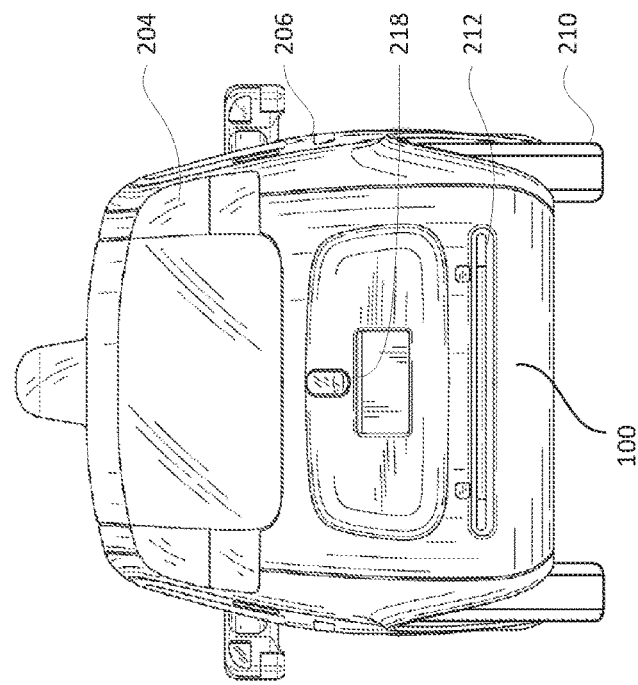
Figure 2B:
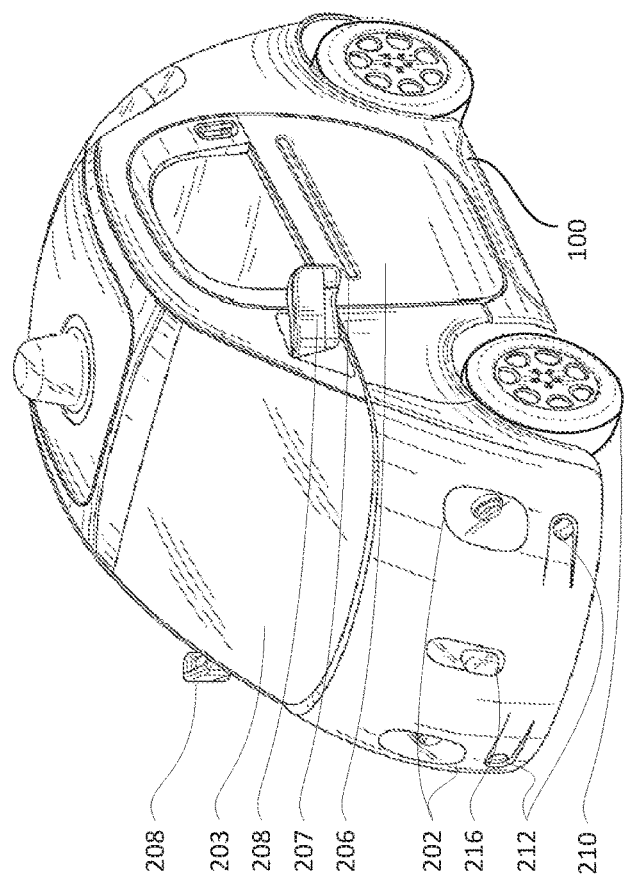
Figure 2D:
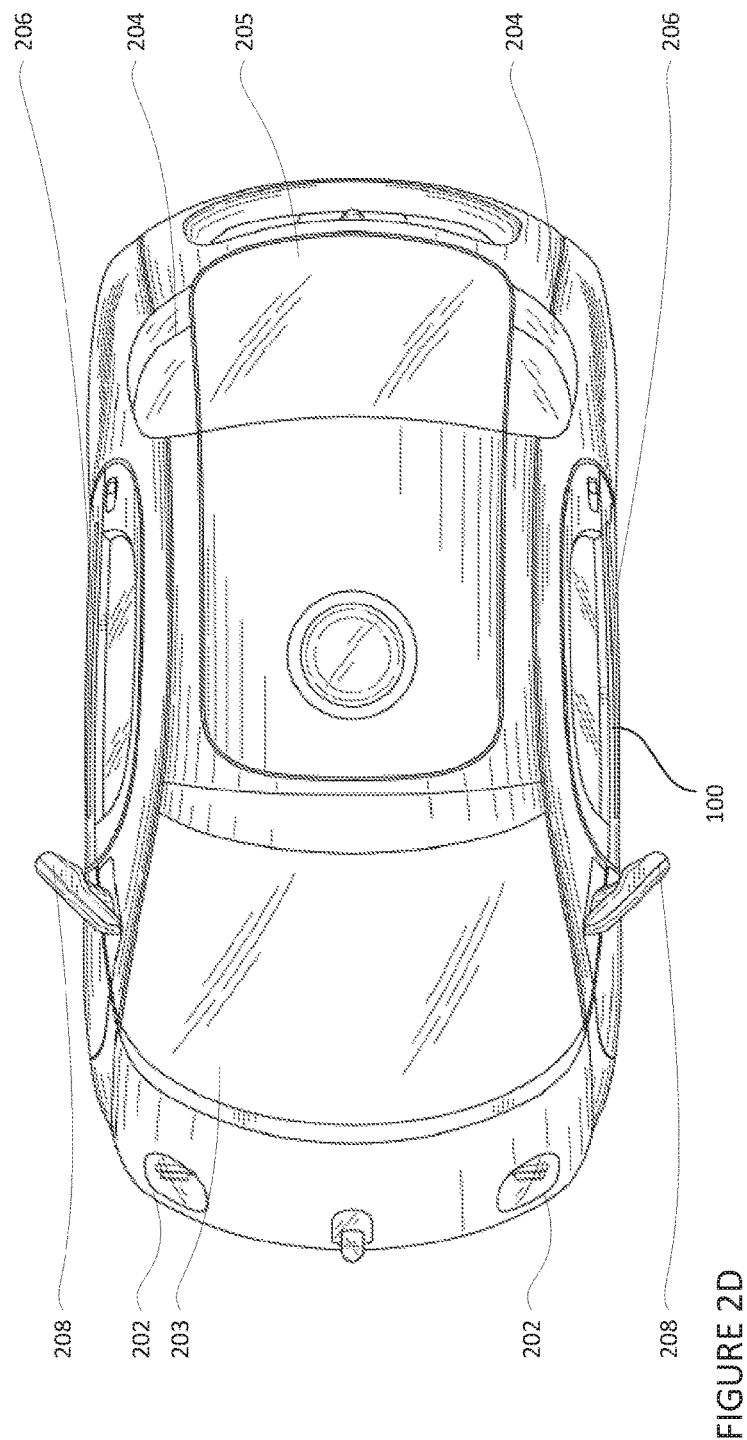

Aspects of the technology relate to detecting collisions between a vehicle and another object. Generally, sensors within a vehicle continually detect the acceleration of the vehicle over a period of time. Large, unplanned changes in the vehicle's acceleration over a short period of time may indicate that the vehicle has been involved in a major collision with high impact forces. However, many collisions experienced by vehicles are minor, occurring at a slow speed with low impact forces. Therefore, the acceleration data received from the sensors during a minor collision may not show enough of a change over a period of time to definitively indicate whether a collision has actually occurred. Further, the acceleration data generated from the sensors may often include a significant amount of low level noise due to the configuration of the vehicle as well as the environments within which the vehicle operates. This low level noise may actually mask portions of the acceleration data at which minor collision are recorded, making the detection of minor collisions difficult.

To detect both major and minor collisions, a collision detection system may categorize occurrences of unexpected changes to a vehicle's acceleration data which satisfy threshold values over a period of time. In this regard, a computing device may continually analyze the acceleration data from the vehicle's sensors as well as the expected acceleration of the vehicle over periods of time for indications of a collision.

Upon determining a change in the vehicle's acceleration data in comparison to the received expected acceleration data satisfies a threshold value, the computing device may initiate the collision verification process to determine whether the occurrence was a collision. The collision verification process may categorize each occurrence according to the amount of change in the vehicle's acceleration data compared to the vehicle's expected acceleration. In this regard the categorize each of the occurrences into two categories, or more or fewer. Each category may be representative of the intensity of the occurrences which are categorized within a respective category, such as a high energy collision category and a low-energy candidate collision category.

In some instances, occurrences may be further categorized into additional categories based upon additional data captured at the time of the occurrence indicating an increased likelihood of a collision. For instance, one or more sensors of the vehicle may scan and record data from the vehicle's surroundings within a certain radius of the vehicle. The computing device of the vehicle may use the sensor data to detect objects and their respective characteristics (position, shape, heading, speed, etc.). The respective characteristics can be used to predict what an object is likely to do for some brief period into the future.

The computing device may analyze the sensor data to determine whether an object in the vehicle's vicinity is capable of contacting the vehicle, was in the vicinity of the vehicle shortly before and/or at the time the occurrence occurred. When the occurrence includes sensor data at captured at or near the time of the occurrence indicating an object was in the vehicle's vicinity and capable of contacting the vehicle the collision verification process may re-categorize the occurrence into another category, such as a high-fidelity low energy collision category which may indicate greater certainty that a collision occurred.

The computing device may perform a responsive action depending on the categorization of the occurrence. In this regard, the computing device may provide alerts and/or adjust operating parameters of the vehicle. For example, the computing device may cause the vehicle to pull over, shut down unnecessary systems, alert emergency response teams, alert remote assistant operators, unlock and/or open the vehicle's doors, etc. In some embodiments the computing device may alert a remote assistant operator. The remote assistant operator may review the data surrounding the occurrence and make a determination of whether or not a collision occurred. Based on the remote assistant operator's determination, the vehicle may be instructed to perform a particular action, or continue functioning as if a collision did not occur.

The features described herein may allow a vehicle, such as an autonomous vehicle, to determine when it has been in a collision. By analyzing potential collisions based on the vehicle's data, appropriate, responsive behaviors may be automated. Further, the features described above use currently available systems of the vehicle to perform the collision analysis, thereby avoiding additional costs.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may be capable of communicating with various components of the vehicle. For example, returning to FIG. 1, computing devices 110 may be in communication with various systems of vehicle 100, such as deceleration system 160, acceleration system 162, steering system 164, signaling system 166, navigation system 168, positioning system 170, and perception system 172 in order to control the movement, acceleration, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed and acceleration of the vehicle. For example, the acceleration system 162 may provide signals to the engine 174 to accelerate at a particular rate. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing devices 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing devices 110. As discussed in further detail below, computing devices 110 may use the positioning system 170 to determine the vehicle's location and perception system 172 to detect and respond to objects when needed to reach the location safely.

FIGS. 2A-2D are examples of external views of vehicle 100. As can be seen, vehicle 100 includes many features of a typical vehicle such as headlights 202, windshield 203, taillights/turn signal lights 204, rear windshield 205, doors 206, side view mirrors 208, tires and wheels 210, and turn signal/parking lights 212. Headlights 202, taillights/turn signal lights 204, and turn signal/parking lights 212 may be associated the signaling system 166. Light bar 207 may also be associated with the signaling system 166.

Vehicle 100 also includes sensors of the perception system 172. For example, housing 214 may include one or more laser devices for having 360 degree or narrower fields of view and one or more camera devices. Housings 216 and 218 may include, for example, one or more radar and/or sonar devices. The devices of the perception system 172 may also be incorporated into the typical vehicle components, such as taillights/turn signal lights 204 and/or side view mirrors 208. Each of these radar, camera, and lasers devices may be associated with processing components which process data from these devices as part of the perception system 172 and provide sensor data to the computing devices 110.

Data 134 may store various behavior-time models for predicting an object's future behavior for a pre-determined period of time, such as the next 10 seconds or more or less. In one example, the behavior-time models may be configured to use data for an object received from the perception system 172, and in particular another road user, including the road user's characteristics as well as additional contextual information discussed in further detail below. As an example, given the location, heading, speed, and other characteristics included in the data from the perception system 172, the behavior-time models may provide a set of one or more predictions for how the object could behave for the predetermined period of time as well as a corresponding likelihood value for each prediction. The predictions may include a trajectory, for instance, defining a set of future locations where the object is expected to be at various times in the future corresponding to the predetermined period of time. The likelihood values may indicate which of the predictions are more likely to occur (relative to one another). In this regard, the prediction with the greatest likelihood value may be the most likely to occur whereas predictions with lower likelihood values may be less likely to occur.

Thus, the behavior-time models may be configured to generate a set of possible hypotheses for what a particular road user or object will do over a particular horizon or predetermined period of time (e.g. 10 seconds) and relative likelihoods for each hypothesis. These models may be trained using data about how an object observed at that location behaved in the past, intuition, etc., and may also be specifically designated for particular types of objects, such as vehicles, pedestrians, motorcycles, bicyclists, etc. The computing devices 110 can then reason about hypotheses that interact with the vehicle's trajectory and are of a sufficient likelihood to be worth considering.

The computing devices 110 may control the direction and speed of the vehicle by controlling various components. By way of example, computing devices 110 may navigate the vehicle to a destination location completely autonomously using data from the detailed map information and navigation system 168. In order to maneuver the vehicle, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between a power system 174 (for instance, a gas or electric engine) of the vehicle and the wheels of the vehicle. Again, by controlling these systems, computing devices 110 may also control the drivetrain of the vehicle in order to maneuver the vehicle autonomously.

Figure 4:
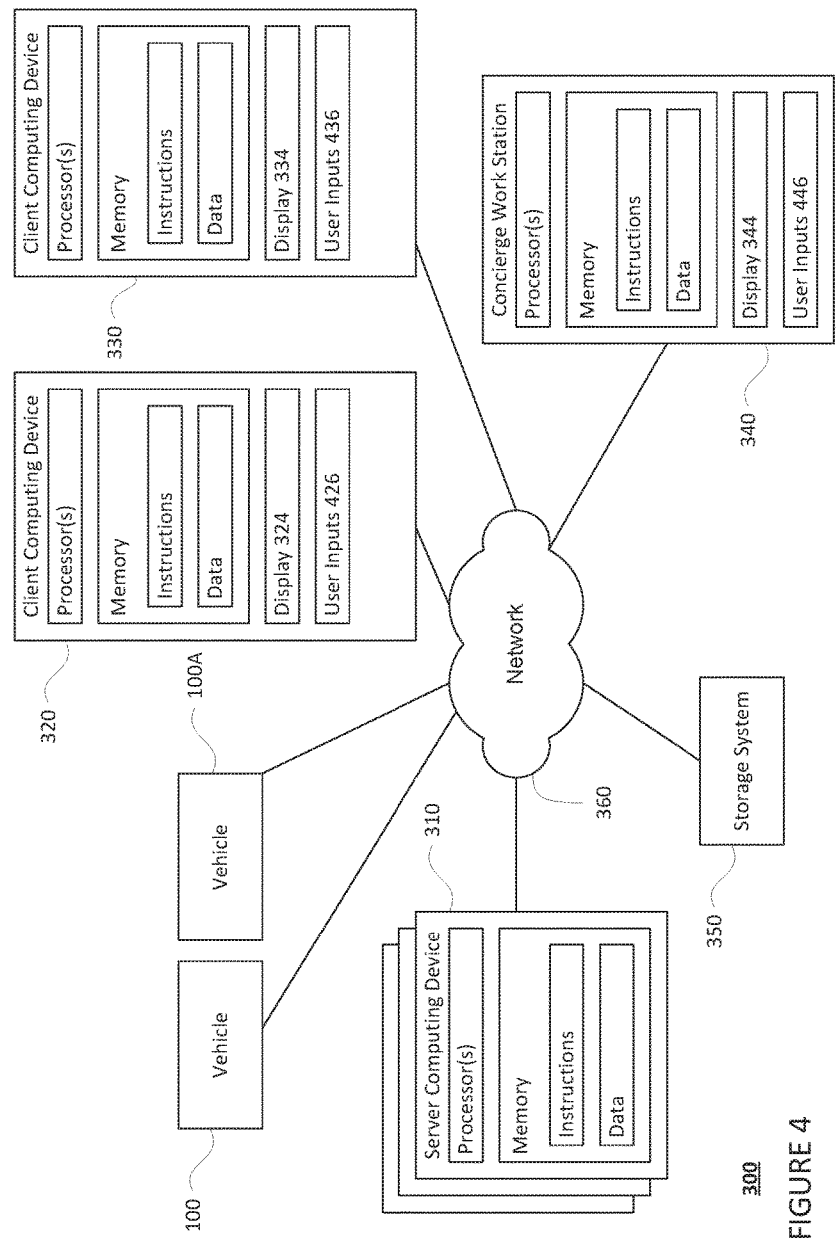
FIG. 4 is a functional diagram of the system of FIG. 3 in accordance with aspects of the disclosure.

The one or more computing devices 110 of vehicle 100 may also receive or transfer information to and from other computing devices. FIGS. 3 and 4 are pictorial and functional diagrams, respectively, of an example system 300 that includes a plurality of computing devices 310, 320, 330, and 340 and a storage system 350 connected via a network 360. System 300 also includes vehicle 100, and vehicle 100A which may be configured similarly to vehicle 100. Although only a few vehicles and computing devices are depicted for simplicity, a typical system may include significantly more computing devices, vehicles, and storage systems.

As shown in FIG. 3, each of computing devices 310, 320, 330, and 340 may include one or more processors, memory, data and instructions. Such processors, memories, data and instructions may be configured similarly to one or more processors 120, memory 130, data 134, and instructions 132 of computing devices 110.

The network 360, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 310 may include a server having a plurality of computing devices, e.g., a load balanced server farm, that exchange information with different nodes of a network for the purpose of receiving, processing and transmitting the data to and from other computing devices. For instance, one or more computing devices 310 may include one or more server computing devices that are capable of communicating with one or more computing devices 110 of vehicle 100 or a similar computing device of vehicle 100A as well as client computing devices 320, 330, and concierge computing device 340 via the network 360. For example, vehicles 100 and 100A may be a part of a fleet of vehicles that can be monitored and dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 310 may use network 360 to transmit and present information to a user, such as users 322 and 332, and remote assistant operator 342, on a display, such as displays 324 and 334 of computing devices 320 and 330, and display 344 of concierge computing device 340. In this regard, computing devices 320 and 330 may be considered client computing devices and computing device 340 may be considered a concierge computing device.

As shown in FIG. 4, each client computing device 320 and 330, as well as concierge computing device 340, may be a personal computing device intended for use by a user 322, 332, or remote assistant operator 342, and have all of the components normally used in connection with a personal computing device including a one or more processors (e.g., a central processing unit (CPU)), memory (e.g., RAM and internal hard drives) storing data and instructions, a display such as displays 324, 334, 344 (e.g., a monitor having a screen, a touch-screen, a projector, a television, or other device that is operable to display information), and user input devices 426, 436, 446 (e.g., a mouse, keyboard, touch-screen or microphone). The client computing devices may also include a camera for recording video streams, speakers, a network interface device, and all of the components used for connecting these elements to one another.

Although the client and concierge computing devices 320, 330, and 340 may each comprise a full-sized personal computing device, they may alternatively comprise mobile computing devices capable of wirelessly exchanging data with a server over a network such as the Internet. By way of example only, client computing device 320 may be a mobile phone or a device such as a wireless-enabled PDA, a tablet PC, a wearable computing device or system, laptop, or a netbook that is capable of obtaining information via the Internet or other networks. In another example, client computing device 330 may be a wearable computing device, such as a "smart watch." As an example the user may input information using a keyboard, a keypad, a multi-function input button, a microphone, visual signals (for instance, hand or other gestures) with a camera or other sensors, a touch screen, etc.

In some examples, concierge computing device 340 may be concierge work station used by an administrator to provide concierge services to users such as users 322 and 332. For example, remote assistant operator 342 may use concierge work station 340 to communicate via a telephone call or audio connection with users through their respective client computing devices or vehicles 100 or 100A in order to ensure the safe operation of vehicles 100 and 100A and the safety of the users as described in further detail below. Although only a single concierge work station 340 and a single remote assistant operator 342 is shown in FIGS. 3 and 4, any number of such work stations and operators may be included in a typical system.

Storage system 350 may store various types of information. This information may be retrieved or otherwise accessed by a server computing device, such as one or more server computing devices 310, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

As with memory 130, storage system 350 can be of any type of computerized storage capable of storing information accessible by the server computing devices 310, such as a hard-drive, memory card, ROM, RAM, DVD, CD-ROM, write-capable, and read-only memories. In addition, storage system 350 may include a distributed storage system where data is stored on a plurality of different storage devices which may be physically located at the same or different geographic locations. Storage system 350 may be connected to the computing devices via the network 360 as shown in FIG. 4 and/or may be directly connected to or incorporated into any of the computing devices 310, 320, 330, 340, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

To detect both major and minor collisions, a computer may categorize occurrences of unexpected changes to a vehicle's acceleration data which satisfy threshold values over a period of time. In this regard, a computing device within the vehicle may continually analyze the acceleration data from the vehicle's sensors as well as the expected acceleration of the vehicle over periods of time for indications of a collision. For instance, an accelerometer in the positioning system 170 of the vehicle 100 may continually provide acceleration data of the vehicle to the computing device, such as computing device 110. Further, expected acceleration data may be received by the computing device 110 within the vehicle. In this regard, the vehicle's acceleration and deceleration systems 160 and 162, which control the speed of the vehicle, may pass acceleration data, representative of the vehicle's expected acceleration to the computing device 110 of the vehicle.

The computing device may continually analyze the vehicle's acceleration data to determine an unexpected occurrence of a change to the vehicle's acceleration. For instance, the computing device may compare the vehicle's acceleration to the vehicle's expected acceleration over a continually moving period of time, such as two hundredths of a second, or more or less. Upon the computing device determining the acceleration of the vehicle 100 is greater than a threshold value, such as ±8 meters/second, or more or less, in comparison to the received expected acceleration data over the period of time, the computing device 110 may initiate the collision verification process to determine whether the occurrence was a collision.

Figure 5:
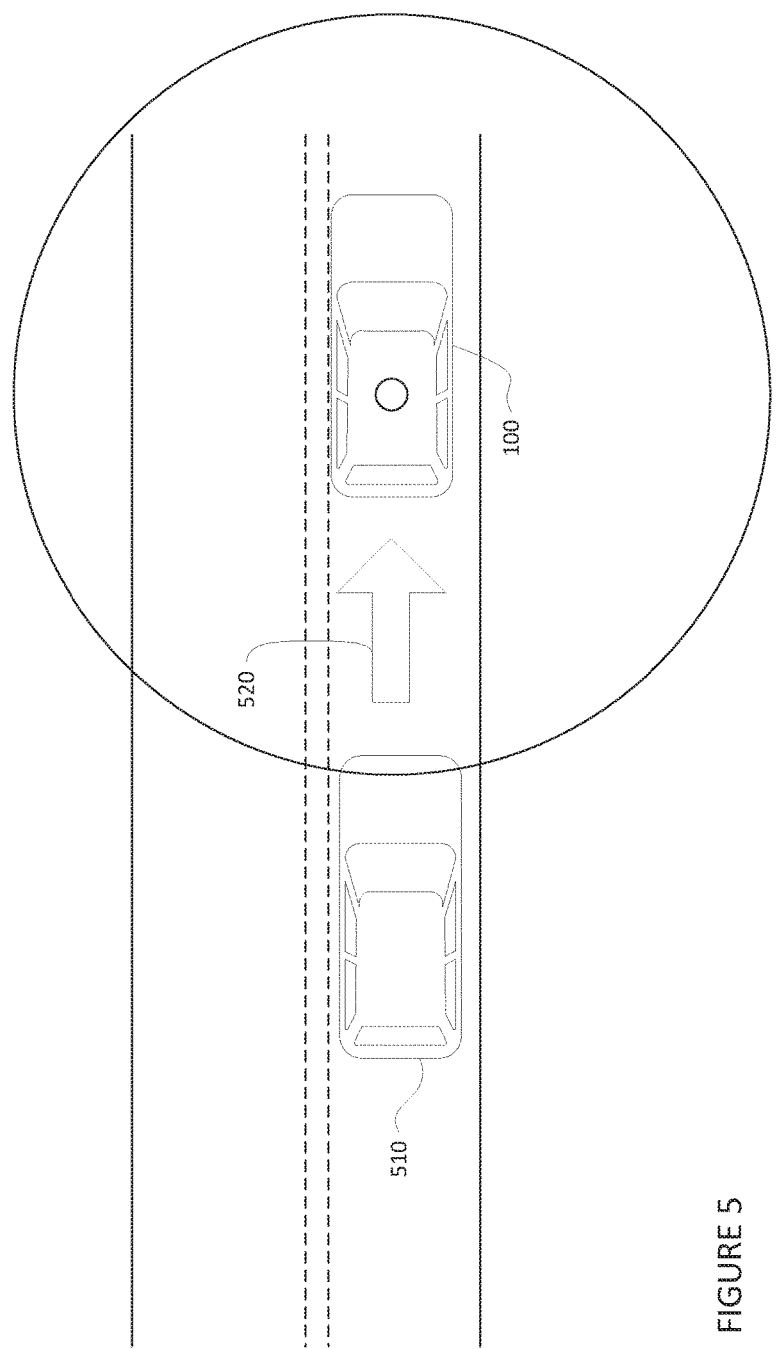
FIG. 5 is a view of a vehicle sensing its surroundings in accordance with aspects of the disclosure.

For example, as shown in FIG. 5, the vehicle 100 may be travelling in a first direction 520 at a first acceleration. A second vehicle 510, travelling faster than the vehicle 100, may collide with a rear end the vehicle 100. The force of the collision between vehicles 100 and 510 may cause vehicle 100 to move at an acceleration rate greater than expected acceleration in direction 520. As such, the computing device 110 may determine an unexpected occurrence of a change to the vehicle's acceleration data of more than 8 m/s$^2$ over 0.025 seconds (where m is meters and s is seconds), and begin the collision verification process.

The collision verification process may categorize each occurrence according to the amount of change in the vehicle's acceleration data compared to the vehicle's expected acceleration. In this regard, the computing device may categorize the collision into two categories, or more or fewer. For instance, each occurrence may be categorized into a high energy collision category or a low-energy candidate collision category when the change between the acceleration of the vehicle and the expected acceleration is greater than or below a threshold value. As an example, an occurrence may be categorized into the high energy collision category where the occurrence corresponds to a change in the vehicle's acceleration of ±20 m/s$^2$, over a period of 0.025 seconds relative to the vehicle's expected acceleration. The occurrence may be categorized into the low energy collision category when the occurrence corresponds to a change in the vehicle's acceleration that is between ±8 m/s$^2$ and ±20 m/s$^2$, over a period of 0.025 seconds when compared to the vehicle's expected acceleration.

Each category may be representative of the intensity of the occurrences which are categorized within a respective category. In this regard, collision intensity may be defined by the change in acceleration of a vehicle over a period of time. For instance, changes in a vehicle's acceleration between ±8 m/s2 and ±20 m/s2, or more or less, over a period of 0.025 seconds may be representative of a minor, low energy collision. Further, changes in a vehicle's acceleration over ±20 m/s2, or more or less, over a period of 0.025 seconds may be representative of a major, high energy collision.

In some embodiments, the collision verification process may categorize the occurrence into the high energy collision category regardless of the vehicle's expected acceleration. In this regard, a change of acceleration ±20 m/s2, over a period of 0.025 seconds, or more or less, may be outside the normal operation of a vehicle and indicative of a collision. As such, the computing device may categorize any occurrence with a change of acceleration ±20 m/s2, over a period of 0.025 seconds into a high energy collision category without comparing the vehicle's acceleration to the vehicle's expected acceleration.

Continuing the above example of FIG. 5, the determined unexpected occurrence may be 10 m/s$^2$ over 0.025 s, which is between the ±8 m/s2 and ±20 m/s2 value corresponding to the low energy collision category. Accordingly, the computing device 110 may categorize the determined unexpected occurrence into the low energy collision category.

Occurrences categorized into the low-energy collision category may be further categorized into one or more additional categories, such as a high-fidelity low energy category, based upon additional data captured at the time of the occurrence indicating an increased likelihood of a collision. The vehicle's perception system 172 may scan and record data from the vehicle's surroundings within a certain radius of the vehicle, as further shown in FIG. 5. Sensor data from one or more of these devices may be passed to the computing device 110 of the vehicle 100.

The computing device 110 of the vehicle 100 may use the sensor data to detect objects and their respective characteristics (position, shape, heading, speed, etc.). These characteristics can be used to predict what an object is likely to do for some brief period into the future. As such, the computing device may analyze the sensor data to determine whether an object in the vehicle's vicinity is capable of contacting the vehicle was in the vicinity of the vehicle shortly before and/or at the time the occurrence occurred.

When the occurrence includes sensor data at captured at or near the time of the occurrence indicating an object was in the vehicle's vicinity and capable of contacting the vehicle the collision verification process may re-categorize the occurrence into the high-fidelity low energy collision category. For instance, as shown in FIG. 5, the perception system 172 of vehicle 100 may determine the second vehicle 510 is within the vehicle's 100 vicinity prior to the collision and capable of contacting the vehicle 100. As such, the unexpected collision may be re-categorized and/or subcategorized into the high-fidelity low energy collision category. In some embodiments, the occurrences may bypass categorization into low-energy collisions category and be directly categorized into the high-fidelity low energy category, or another category.

Depending on the categorization of the occurrence the computing device 110 may perform a responsive action. In this regard, the computing device 110 may provide alerts and/or adjust operating parameters of the vehicle. For example, if an occurrence is categorized as a high energy collision, the computing device may cause the vehicle to perform one or more responsive actions such as pull over, shut down unnecessary systems, alert emergency response teams, alert remote assistant operators, unlock and/or open the vehicle's doors, etc.

In the event the occurrence is categorized as a low energy collision, the computing device 110 may alert a remote assistant operator 342 at the concierge work station 340. For example, the computing device 110 may send collision data, including the acceleration data of the vehicle, expected acceleration data of the vehicle, the collision category, sensor data, and other such data surrounding the collision, to the remote assistant operator. In this regard, the data surrounding the collision may also be sent to a server, such as server 310, or the collision data may be sent directly to the concierge work station 340 of the remote assistant operator 342. Such transmission of data may occur over a network, such as network 360 via a wireless network connection, such as wireless network connection 156.

The remote assistant operator 342 may review the data surrounding the occurrence and make a determination of whether or not a collision occurred. Based on the remote assistant operator's determination, the remote assistant operator may cause the concierge work station 340 to instruct the vehicle 110 to perform a responsive action such as pull over, shut down unnecessary systems, alert emergency response teams, alert the vehicle's occupants, unlock and/or open the vehicle's doors, etc. In some embodiments the concierge work station 340 may communicate directly with the vehicle 100 or through server 310.

In the event the occurrence is categorized as a high-fidelity low energy collision, the computing device may automatically alert the remote assistant operator and/or occupants of the vehicle of the collision. In addition, the computing device may cause the vehicle to perform a response action such as pull over, shut down unnecessary systems, alert emergency response teams, alert remote assistant operators, unlock and/or open the vehicle's doors, etc. The remote assistant operator may cause the vehicle to perform additional responsive actions.

Figure 6:
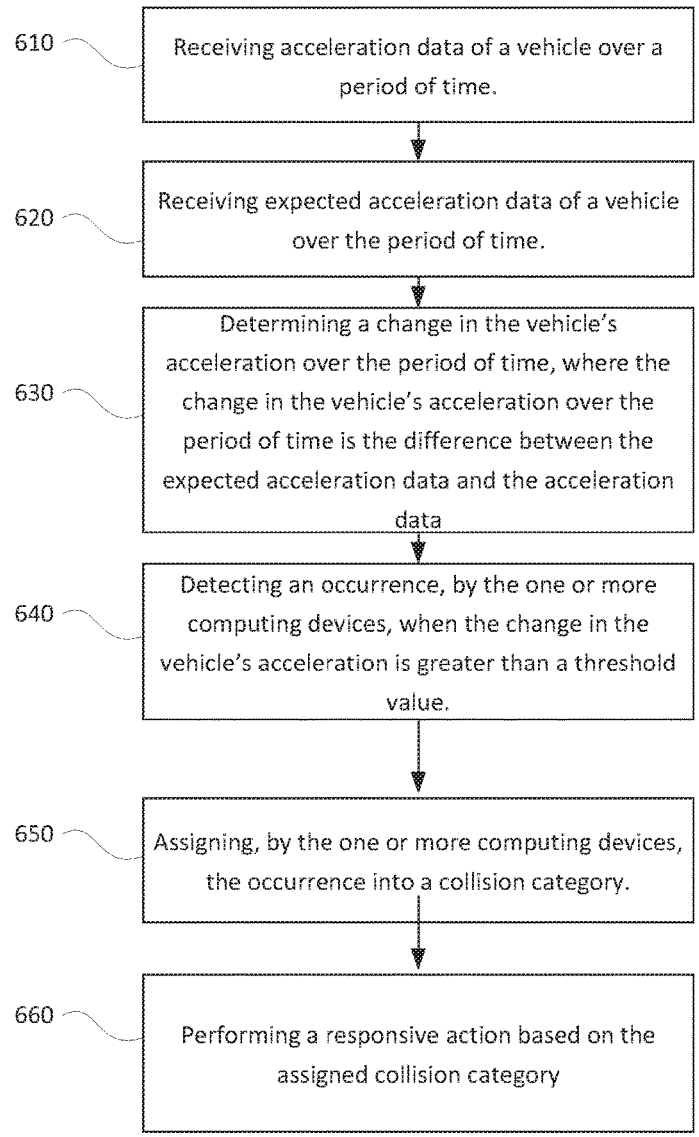
FIG. 6 is a flow diagram in accordance with aspects of the disclosure.

FIG. 6 is an example flow diagram 600 which may be performed by one or more computing devices of a vehicle, such as computing device 110 of vehicle 100 in order to detect collisions. In this example, an acceleration data of the vehicle 100 may be received over a period of time, as shown in block 610. The expected acceleration data may also be received over the period of time, as shown at block 620. A change in the vehicle's acceleration over the period of time, where the change in the vehicle's acceleration over the period of time is the difference between the expected acceleration data and the acceleration data may be determined, as shown in block 630. Block 640 shows a detection of an occurrence, when the change in the vehicle's acceleration is greater than a threshold value. The occurrence may be assigned into a collision category, as shown in block 650 and a responsive action based on the assigned collision category may be performed as shown in block 660.

Unless otherwise stated, the foregoing alternative examples are not mutually exclusive, but may be implemented in various combinations to achieve unique advantages. As these and other variations and combinations of the features discussed above can be utilized without departing

The invention claimed is:

1. A computer implemented method for detecting vehicle collisions, the method comprising:
   receiving, by one or more computing devices, acceleration data of a vehicle over a period of time;
   receiving, by the one or more computing devices, expected acceleration data of the vehicle over the period of time;
   determining, by the one or more computing devices, a change in the vehicle's acceleration over the period of time, where the change in the vehicle's acceleration over the period of time is a difference between the expected acceleration data and the acceleration data;
   detecting an occurrence, by the one or more computing devices, when the change in the vehicle's acceleration is greater than a threshold value;
   assigning, by the one or more computing devices, the occurrence into a collision category including a high energy collision category, a low energy collision category or a high-fidelity low energy collision category;
   performing, by the one or more computing devices, a responsive action based on the assigned collision category;
   receiving, by the one or more computing devices, additional data of a vehicle's surroundings captured by a sensor during the period of time;
   determining based on the additional data, by the one or more computing devices, an object in the vehicle's surroundings and capable of contacting the vehicle during the period of time; and
   based on the determining of the object, re-categorizing the occurrence from the assigned collision category to another collision category, different than the assigned collision category,
   wherein when the occurrence is categorized as the low energy collision category a communication from a remote assistance operator causes the vehicle to perform a responsive action of shutting down and
   wherein when the occurrence is categorized as the high-fidelity low energy collision category the vehicle performs the responsive action of shutting down.

2. The method of claim 1, wherein the expected acceleration data is received from an acceleration and deceleration system and the acceleration data is received from a positioning system.

3. The method of claim 1, wherein when the occurrence is categorized as a high energy collision category, the responsive action performed by the one or more computing devices includes one or more of shutting down an engine, alerting occupants of the vehicle, alerting an emergency response team, alerting a remote assistant operator, unlocking and/or opening doors of the vehicle, and/or causing the vehicle to pull over and stop.

4. A system for or detecting vehicle collisions, the system comprising one or more processors configured to:
   receive acceleration data of a vehicle over a period of time;
   receive expected acceleration data of the vehicle over the period of time;
   determine a change in the vehicle's acceleration over the period of time, where the change in the vehicle's acceleration over the period of time is a difference between the expected acceleration data and the acceleration data;
   detect an occurrence when the change in the vehicle's acceleration is greater than a threshold value;
   assign the occurrence into a collision category including a high energy collision category, a low energy collision category or a high-fidelity low energy collision category;
   perform a responsive action based on the assigned collision category;
   receive additional data of a vehicle's surroundings captured by a sensor during the period of time;
   determine, based on the additional data, an object in the vehicle's surroundings and capable of contacting the vehicle during the period of time; and
   based on the determining of the object, re-categorize the from the assigned collision category to another collision category, different than the assigned collision category,
   wherein when the occurrence is categorized as the low energy collision category a communication from a remote assistance operator causes the vehicle to perform a responsive action of shutting down and
   wherein when the occurrence is categorized as the high-fidelity low energy collision category the vehicle performs the responsive action of shutting down.

5. The system of claim 4, wherein the expected acceleration data is received from an acceleration and deceleration system and the acceleration data is received from a positioning system.

6. The system of claim 5, wherein when the occurrence is categorized as a high energy collision category, the responsive action performed by the one or more computing devices includes one or more of shutting down an engine, alerting occupants of the vehicle, alerting an emergency response team, alerting a remote assistant operator, unlocking and/or opening doors of the vehicle, and/or causing the vehicle to pull over and stop.

7. The system of claim 4, wherein the system further comprises the vehicle.

8. A non-transitory computer readable medium on which instructions are stored, the instructions when executed by one or more processors, cause the one or more processors to perform a method of detecting vehicle collisions, the method comprising:
   receiving acceleration data of a vehicle over a period of time;
   receiving expected acceleration data of the vehicle over the period of time;
   determining a change in the vehicle's acceleration over the period of time, where the change in the vehicle's acceleration over the period of time is the difference between the expected acceleration data and the acceleration data;
   detecting an occurrence when the change in the vehicle's acceleration is greater than a threshold value;
   assigning the occurrence into a collision category including a high energy collision category, a low energy collision category or a high-fidelity low energy collision category;

performing a responsive action based on the assigned collision category receiving additional data of a vehicle's surroundings captured by a sensor during the period of time;

determining based on the additional data an object in the vehicle's surroundings and capable of contacting the vehicle during the period of time; and based on the determining of the object, re-categorizing the occurrence from the assigned collision category to another collision category, different than the assigned collision category, wherein when the occurrence is categorized as the low energy collision category a communication from a remote assistance operator causes the vehicle to perform a responsive action of shutting down and wherein when the occurrence is categorized as the high-fidelity low energy collision category the vehicle performs the responsive action of shutting down.

9. The non-transitory computer readable medium of claim 8, wherein the expected acceleration data is received from an acceleration and deceleration system and the acceleration data is received from a positioning system.

10. The non-transitory computer readable medium of claim 9, wherein when the occurrence is categorized as a high energy collision category, the responsive action performed by the one or more computing devices includes one or more of shutting down an engine, alerting occupants of the vehicle, alerting an emergency response team, alerting a remote assistant operator, unlocking and/or opening doors of the vehicle, and/or causing the vehicle to pull over and stop.

* * * * *